(12) United States Patent
Kim et al.

(10) Patent No.: US 7,663,636 B2
(45) Date of Patent: Feb. 16, 2010

(54) APPARATUS AND METHOD FOR AUTOMATICALLY ANALYZING DIGITAL VIDEO QUALITY

(75) Inventors: Jin Seo Kim, Taejon (KR); Maeng Sub Cho, Taejon (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 421 days.

(21) Appl. No.: 11/437,611

(22) Filed: May 22, 2006

(65) Prior Publication Data

US 2007/0120863 A1 May 31, 2007

(30) Foreign Application Priority Data

Nov. 25, 2005 (KR) .................... 10-2005-0113590

(51) Int. Cl.
*G09G 5/00* (2006.01)

(52) U.S. Cl. .................. 345/581; 345/582; 345/589; 345/603

(58) Field of Classification Search .............. 345/581, 345/582–618; 382/112, 199, 206, 228, 254, 382/266, 269, 272; 348/14.01–843
See application file for complete search history.

(56) References Cited

U.S. PATENT DOCUMENTS

| 5,850,472 | A  | * | 12/1998 | Alston et al. | ............... 382/162 |
| 6,295,369 | B1 | * | 9/2001  | Gordon        | ............... 382/162 |
| 6,577,764 | B2 | * | 6/2003  | Myler et al.  | ............... 382/228 |
| 6,704,451 | B1 |   | 3/2004  | Hekstra et al. | |
| 2002/0145610 | A1 | * | 10/2002 | Barilovits et al. | .......... 345/538 |
| 2003/0012430 | A1 | * | 1/2003  | Risson        | ............... 382/165 |
| 2003/0031368 | A1 | * | 2/2003  | Myler et al.  | ............... 382/228 |
| 2004/0156559 | A1 | * | 8/2004  | Cheng et al.  | ............... 382/286 |
| 2004/0197020 | A1 | * | 10/2004 | Sones         | ............... 382/162 |

(Continued)

FOREIGN PATENT DOCUMENTS

KR   1020030074041   9/2003

(Continued)

*Primary Examiner*—Xiao M Wu
*Assistant Examiner*—Abderrahim Merouan
(74) *Attorney, Agent, or Firm*—Lowe Hauptman Ham & Berner LLP

(57) ABSTRACT

An apparatus and method for automatically analyzing digital video quality are provided. The apparatus for automatically analyzing digital video quality includes a video analyzing unit and a result displaying unit. The video analyzing unit analyzes a texture attribute of an input video and analyzes a color attribute of the input video, thereby obtaining a texture attribute analysis result and a color attribute analysis result. The result displaying unit determines whether a reference video for video quality analysis exists or not. When the reference video exists, the result displaying unit determines the texture attribute analysis result as a main component analysis result and the color attribute analysis result as a minor component analysis result, respectively, and displays the determined analysis results on a screen in a form of numerical values and graphs together with the input video. On the contrary, when the reference video does not exist, the result displaying unit determines the texture attribute analysis result as the minor component analysis result and the color attribute analysis result as the major component analysis result, respectively, and displays the determined analysis results on the screen in a form of numerical values and graphs together with the input video. Accordingly, the digital video quality can be automatically analyzed and displayed.

7 Claims, 4 Drawing Sheets

U.S. PATENT DOCUMENTS

2004/0249861 A1* 12/2004 Hoshino et al. .......... 707/104.1
2005/0027482 A1* 2/2005 Benaoudia et al. .......... 702/183
2005/0219362 A1 10/2005 Garoutte
2005/0226462 A1* 10/2005 Wittebrood et al. .......... 382/103

FOREIGN PATENT DOCUMENTS

KR 1020050007721 1/2005

\* cited by examiner

APPARATUS AND METHOD FOR AUTOMATICALLY ANALYZING DIGITAL VIDEO QUALITY

BACKGROUND OF THE INVENTION

1. Field of the Invention

The present invention relates to an apparatus and method for automatically analyzing digital video quality, and more particularly, to an apparatus and method for automatically analyzing digital video quality, which can be applied to fields that produce digital video contents, such as digital movie, computer graphics, digital broadcasting, advertisement, and publication, and provide content services. In the apparatus and method of the present invention, final digital video is analyzed according to video quality analyzing factors, which are predefined so as to determine video quality, and the analysis results normalized according to the video quality analyzing factors are provided in a form of numerical values and graphs, thereby allowing video producers to modify the digital video according to the analysis results.

2. Description of the Related Art

Generally, a conventional process of producing digital video contents using a computer does not include a series of processes of analyzing digital video quality, modifying the digital video contents based on the analysis results, and producing high-quality digital video contents. The video quality is determined by complicated factors, such as an intention of a producer, a color reproduction of an imaging device, and a subjective assessment of a viewer with respect to the digital video quality. Therefore, in the current technology of producing and reproducing digital video contents, it is very difficult to unify the complicated factors to one reference factor for assessing the digital video quality and modifying the digital video contents.

When a reference video exists, the reference for human's assessment of video quality with respect to color video contents is greatly influenced by factors such as shapes and textures of objects that commonly exist in the reference video and the target video. On the contrary, when a reference video does not exist, the reference is greatly influenced by color factors, such as brightness or sharpness. Therefore, an apparatus for analyzing a standardized video quality is demanded which can automatically analyze the digital video quality and provide the analysis results, based on the above-described characteristics, so that the viewers can give high assessment to the finally modified digital video contents.

Meanwhile, one example is disclosed in U.S. Pat. No. 6,704,451, issued on Mar. 9, 2004 and entitled "Method and arrangement for objective assessment of video quality", and another example is disclosed in Korean Patent Application No. 10-2002-23356, filed on Apr. 29, 2002 and entitled "Apparatus and method for objective measurement of video quality". These technologies relate to general methods for assessment of digital video quality. However, these technologies do not yet consider the above-described characteristics that when a reference video exists, the criterion for human's assessment of video quality with respect to color video contents is greatly influenced by factors such as shapes and textures of objects that commonly exist in the reference video and the target video, and when a reference video does not exist, the criterion is greatly influenced by color related factors, such as brightness or sharpness.

SUMMARY OF THE INVENTION

It is an object of the present invention to provide an apparatus and method for automatically analyzing digital video quality, in which a texture attribute of an input video is analyzed when a reference video exists, whereas a color attribute of the input video is analyzed when the reference video does not exist. Then, the analysis results and the input video are displayed on a single screen.

According to an aspect of the present invention, there is provided an apparatus for automatically analyzing digital video quality, including: a video analyzing unit for analyzing a texture attribute of an input video and analyzing a color attribute of the input video, thereby obtaining a texture attribute analysis result and a color attribute analysis result; and a result displaying unit for determining whether a reference video for video quality analysis exists or not; when the reference video exists, determining the texture attribute analysis result as a main component analysis result and the color attribute analysis result as a minor component analysis result, respectively, and displaying the determined analysis results on a screen in a form of numerical values and graphs together with the input video; and, when the reference video does not exist, determining the texture attribute analysis result as the minor component analysis result and the color attribute analysis result as the major component analysis result, respectively, and displaying the determined analysis results on the screen in a form of numerical values and graphs together with the input video.

According to another aspect of the present invention, there is provided a method for automatically analyzing digital video quality, including the steps of: (a) receiving a target video to be analyzed, and determining an importance factor for determining weights of main and minor components to determine a final video quality; (b) performing a preprocessing of a texture analysis, the preprocessing operation including calculating histogram, noise and reflection attribute of an input video and sequentially analyzing a texture attribute, a reflection attribute, and an edge attribute of the input video; (c) converting R, G and B color values of the input video into device-independent XYZ color space in combination with the operation (b), converting the XYZ color space into color values of standard color space, and sequentially analyzing a brightness attribute, a saturation attribute, and a contrast attribute of the input video; (d) determining whether a reference video exists or not, determining a main component analysis factor and a minor component analysis factor by using a texture attribute and a color attribute, and calculating a final video quality analysis result by using the determined main and minor component analysis factors, and the importance factor; and (e) displaying the input video and the final video quality analysis result of the operation (d) in a form of numerical values and graphs.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
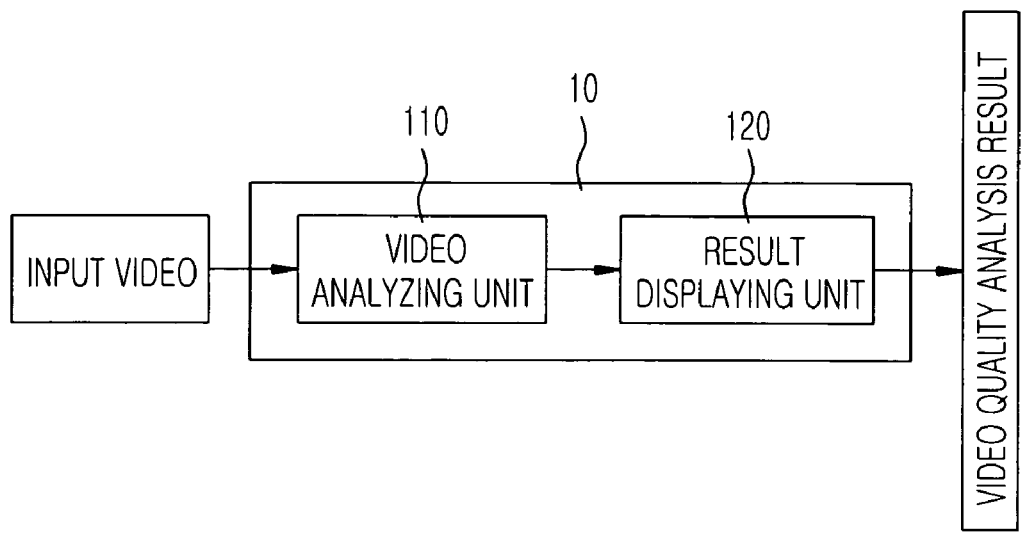
FIG. 1 is a block diagram of an apparatus for automatically analyzing digital video quality according to an embodiment of the present invention.

FIG. 1 is a block diagram of an apparatus for automatically analyzing digital video quality according to an embodiment of the present invention.

Referring to FIG. 1, the apparatus 10 of the present embodiment includes a video analyzing unit 110 and a result displaying unit 120.

A video produced or combined as a final video content by a computer is inputted to the video analyzing unit 110 in order to analyze digital video quality. The video analyzing unit 110 analyzes the input video based on analysis factors (e.g., surface reflection characteristic, surface texture, edge characteristic, etc.) representing surface attributes of an object and background, and color factors (e.g., brightness, sharpness, contrast, etc.), then provides the analysis results to the result displaying unit 120. The result displaying unit 120 determines whether a reference video for analysis of the video quality exists or not. When the reference video exists, the result displaying unit 120 determines the analysis result of the texture attribute as a main component analysis result and the analysis result of the color attribute as a minor component analysis result, and displays the determined results on a screen. On the contrary, when the reference video does not exist, the result displaying unit 120 determines the analysis result of the color attribute as a main component analysis result and the analysis result of the texture attribute as a minor component analysis result, and displays the determined results on a screen.

Figure 2:
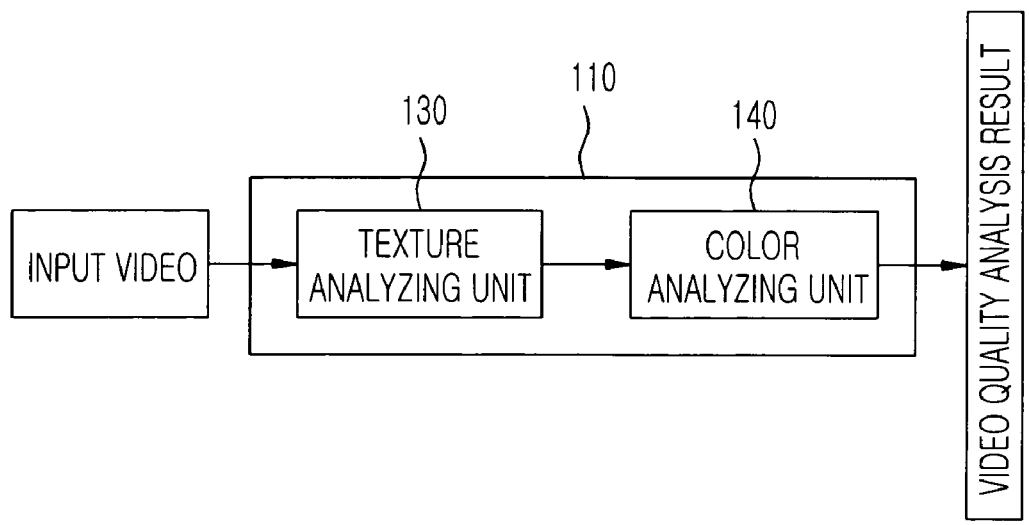
FIG. 2 is a block diagram of a video analyzing unit shown in FIG. 1.

FIG. 2 is a block diagram of the video analyzing unit 110 shown in FIG. 1.

Referring to FIG. 2, the video analyzing unit 110 includes a texture analyzing unit 130 and a color analyzing unit 140. The texture analyzing unit 130 analyzes the texture attributes of the input video (e.g., reflection characteristic, texture, noise characteristic of the object existing in the input video) using a previously stored database and a frequency domain analysis. The color analyzing unit 140 analyzes color attributes of R, G and B values with respect to the corresponding pixels of the input video, and displays its analysis results in a form of numerical values.

Figure 3:
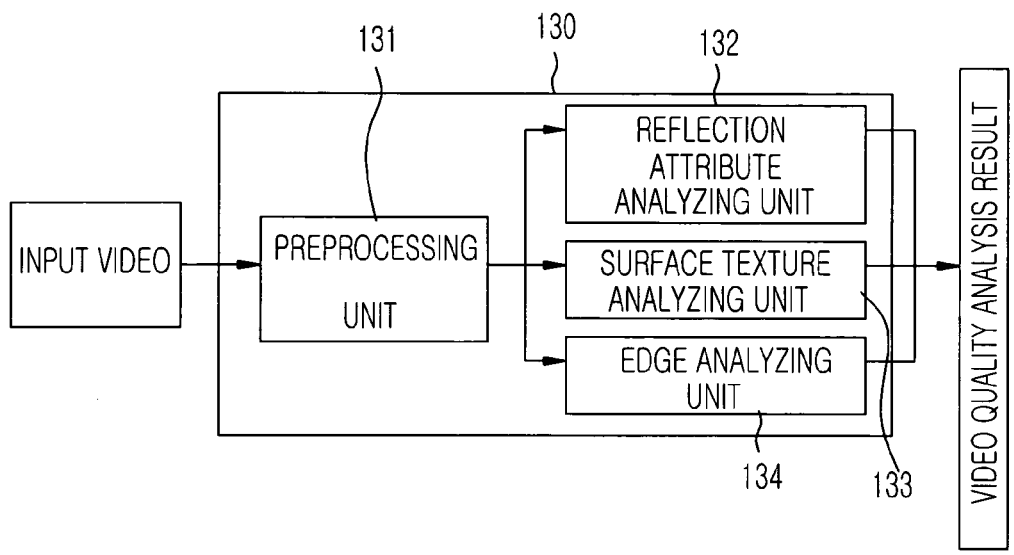
FIG. 3 is a block diagram of a texture analyzing unit shown in FIG. 2.

FIG. 3 is a block diagram of the texture analyzing unit 130 shown in FIG. 2.

Referring to FIG. 3, the texture analyzing unit 130 includes a preprocessing unit 131, a reflection attribute analyzing unit 132, a surface texture analyzing unit 133, and an edge analyzing unit 134. The preprocessing unit 131 performs a basic analysis on the texture attributes, such as histogram analysis and noise analysis of the input video, using the previously stored database and the video process based on the frequency domain. The reflection attribute analyzing unit 132 analyzes the surface reflection attribute of the object contained in the input video according to the basic analysis result received from the preprocessing unit 131, and outputs its analysis results in a form of normalized numerical values. The surface texture analyzing unit 133 analyzes the surface texture and outputs its analysis result in a form of normalized numerical values. The edge analyzing unit 134 analyzes the edge attribute of the object and outputs its analysis result in a form of normalized numerical values. Also, the preprocessing unit 131 may quantify the texture attributes of the object by extracting the surface reflection characteristic, texture, and noise. According to the embodiments of the present invention, the analysis results are quantified into the numerical values ranging from 0 to 100.

Figure 4:
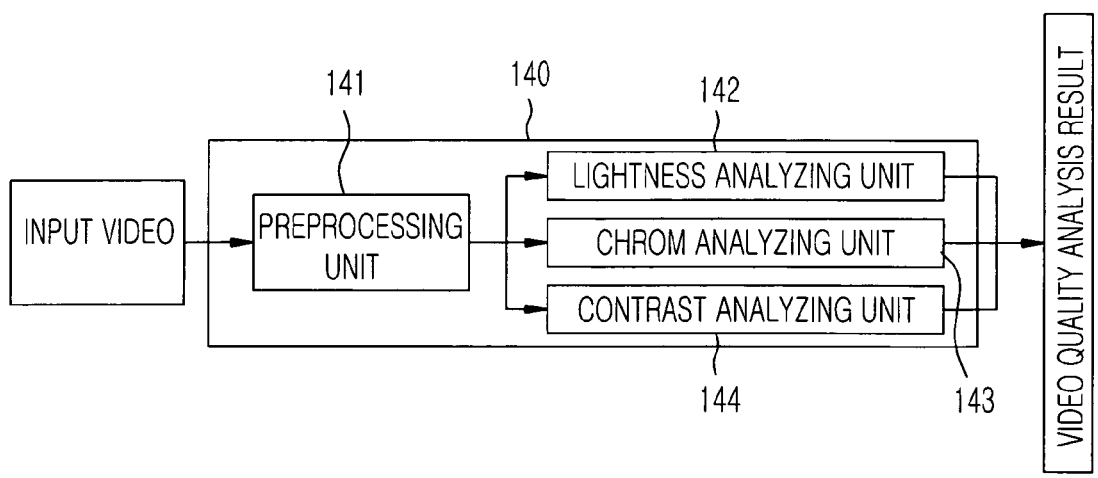
FIG. 4 is a block diagram of a color analyzing unit shown in FIG. 2.

FIG. 4 is a block diagram of the color analyzing unit 140 shown in FIG. 2.

Referring to FIG. 4, the color analyzing unit 140 includes a preprocessing unit 141, a brightness analyzing unit 142, a saturation analyzing unit 143, and a contrast analyzing unit 144. The preprocessing unit 141 transforms the R, G, B color values of the input video into uniform color domain ($L^*_{ab}$) in order to analyze the color attributes such as lightness, chroma, and contrast with respect to the color factors of the input video. For the uniform color space conversion, the preprocessing unit 131 converts the R, G, B color values of each pixel into device-independent XYZ color space using Eq. 1 below. At this point, it is assumed that sRGB color space is adopted as the R, G and B color values.

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad \text{(Eq. 1)}$$

For the analysis of the color attributes, the color values transformed into the XYZ color space are converted into CIELAB values, which are one of standard color space of ISO/CIE, using Eq. 2 below. Lightness, chroma and contrast of the video contents are analyzed using the converted values of L*, a* and b* at each pixel, and the analysis results are outputted in a form of numerical values.

$$L^* = 116\left(\frac{Y}{Y_n}\right)^{1/3} - 16 \quad \text{for } \frac{Y}{Y_n} > 0,.008856 \quad \text{(Eq. 2)}$$

$$L^* = 903.3\left(\frac{Y}{Y_n}\right) \quad \text{for } \frac{Y}{Y_n} > 0,.008856$$

$$a^* = 500\left[\left(\frac{X}{X_n}\right)^{1/3} - \left(\frac{Y}{Y_n}\right)^{1/3}\right]$$

$$b^* = 200\left[\left(\frac{Y}{Y_n}\right)^{1/3} - \left(\frac{Z}{Z_n}\right)^{1/3}\right]$$

$$C^* = [(a^*)^2 + (b^*)^2]^{1/2}$$

where L* denotes the lightness value of the pixel and C* denotes the chroma value of the pixel.

The lightness analyzing unit 142 analyzes the lightness of the input video using the lightness value L* converted by the preprocessing unit 141. The chroma analyzing unit 143 analyzes the chroma of the input video using the chroma values a* and b* obtained from Eq. 2. The contrast analyzing unit 144 analyzes the contrast of the input video using the lightness value and the R, G, B color values.

Figure 5:
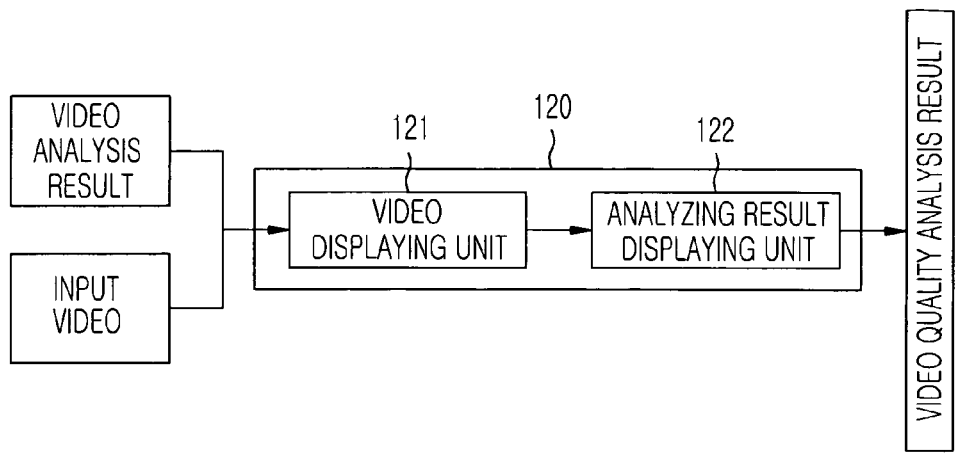
FIG. 5 is a block diagram of a result displaying unit shown in FIG. 1.

FIG. 5 is a block diagram of the result displaying unit shown in FIG. 1.

Referring to FIG. 5, the result displaying unit 120 includes a video displaying unit 121 and an analysis result displaying unit 122.

The result displaying unit 120 receives the video quality analysis result outputted from the video analyzing unit 110 and the initial input video. Then, the video displaying unit 121 displays the initial input video at a left portion of the screen, and the analysis result displaying unit 122 displays the video quality analysis result at a right portion of the screen in a form of numerical values and bar graphs according to the video quality factors.

Figure 6:
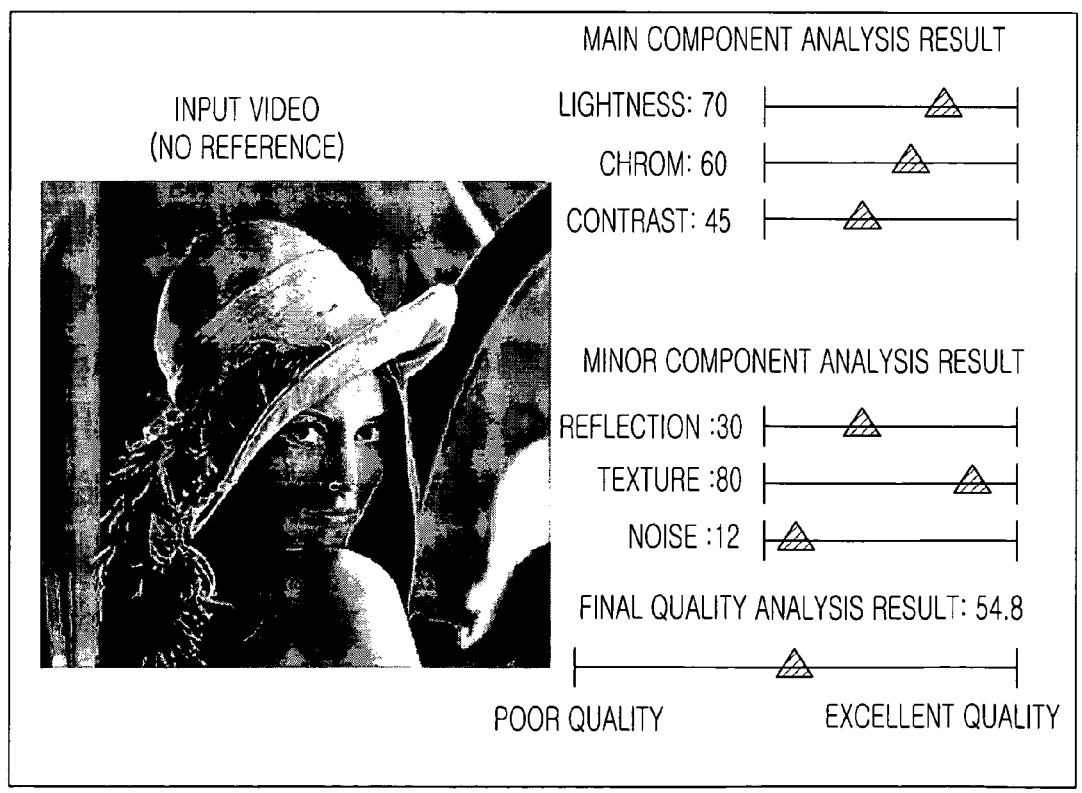
FIG. 6 is an exemplary diagram showing an analyzing result of final digital video quality.

FIG. 6 is an exemplary diagram showing the analysis results of the final video quality, which are displayed by the result displaying unit 120.

Specifically, FIG. 6 shows the analysis result of the video quality when the reference video does not exist. If the reference video exists, the main component analysis factor and the minor component analysis factors are exchanged. At this point, the analysis result of each factor is expressed as the normalized values ranging from 0 to 100. The analysis result of "0" means that the video quality is lowest, and the analysis result of "100" means that the video quality is highest. The analysis result of the final video quality is determined by Eq. 3 below.

$$\text{Final Video Quality} = \left\{ k \sum (\text{Main Component Analysis Result}) + (1-k) \sum (\text{Minor Component Analysis Result}) \right\} / 3 \quad \text{(Eq. 3)}$$

In Eq. 3, k is an importance factor and is substituted into Eq. 3 in order to determine weights of the main and minor components for determining the final video quality. The k factor is obtained through a simulation. In FIG. 6, the final video quality is 54.8, which indicates that a general person feels the input video like it has a slightly high quality.

Figure 7:
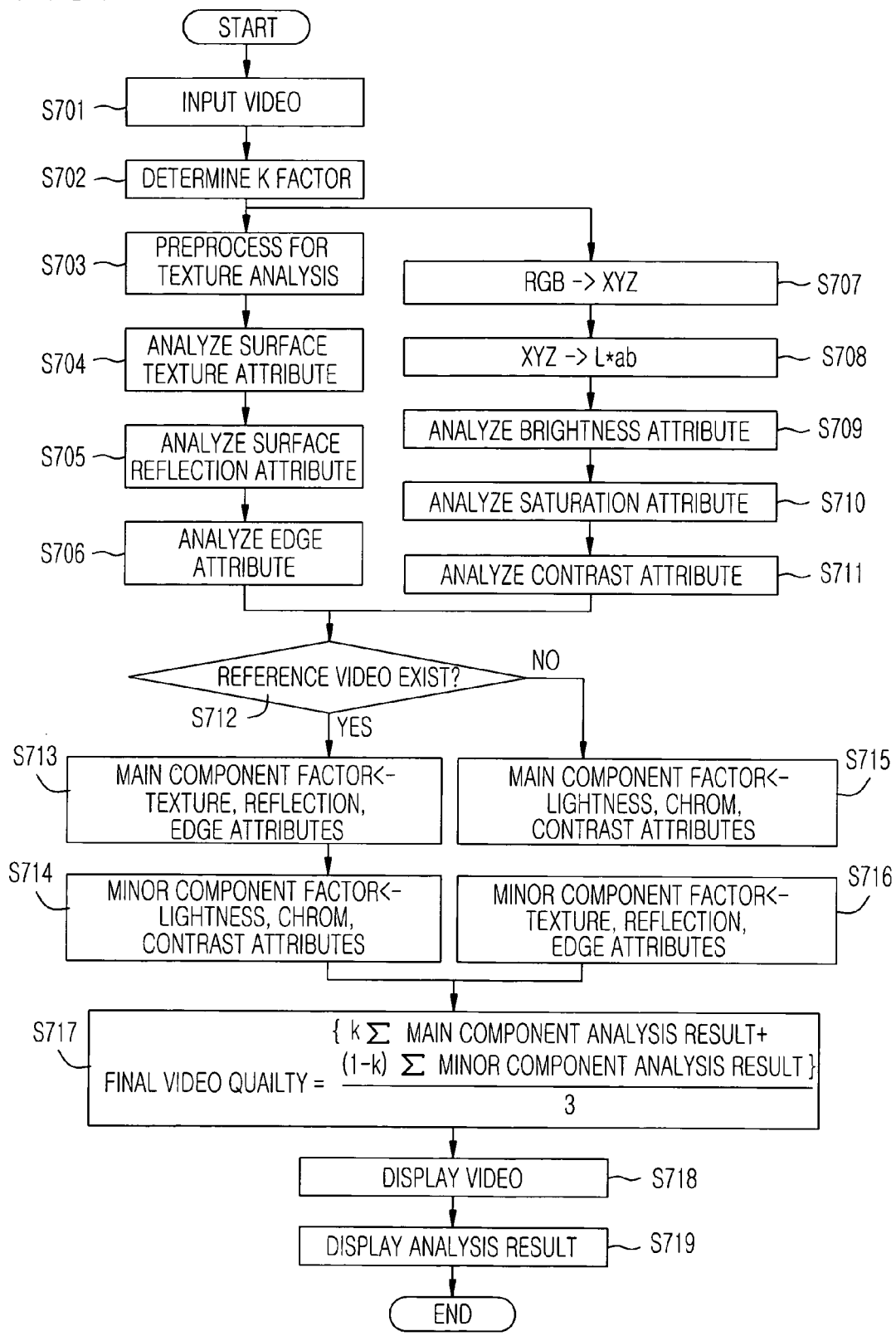
FIG. 7 is a flowchart showing a method for automatically analyzing digital video quality according to an embodiment of the present invention.

FIG. 7 is a flowchart illustrating a method for automatically analyzing the digital video quality according to an embodiment of the present invention.

Referring to FIG. 7, in step S701, a target video to be analyzed is inputted. In step S702, a k factor for generating a final analysis result is determined. At this point, if a weight for a main component needs to increase, the k factor is determined to have a value close to "1". On the contrary, if a weight for a minor component needs to increase, the k factor is determined to have a value close to "0". Then, a text analysis and a color analysis are performed for automatically analyzing the quality analysis of the input video.

Next, in step S703, a preprocessing of the texture analysis is performed. That is, histogram, noise and reflection attribute of the input video are calculated. In step S704, after the preprocessing of the texture analysis is completed, the texture attribute of the current input video is analyzed by a previously stored database. In step S705, the reflection attribute of the input video with respect to the corresponding texture attribute is analyzed based on the analyzed texture attribute information. In step S706, the edge attribute of the input video is analyzed.

In step S707 to S711, the color attribute is analyzed after step S702 in combination with steps S703 to S706. Specifically, in step S707, the conversion into the device-independent XYZ color space is performed for the color attribute analysis of the R, G and B color values for each pixel of the input video. In step S708, the converted XYZ values are converted into the uniform color space, that is, $L^*_{ab}$ color space. In step S709, the lightness attribute of the input video is analyzed using the pixel lightness value $L^*$. In step S710, the chroma attribute is analyzed using the chroma values a* and b*. Then, in step S711, the contrast attribute of the input video is analyzed using the lightness values and the RGB color values expressed in range from 0 to 255. Through the steps S706 to S711, the texture attribute and the color attribute analysis of the input video are completed. The analysis result of the input video is stored as a value ranging from 0 to 100. The analysis result of "0" means that the quality of the analyzed component is lowest and the analysis result of "100" means that the quality of the analyzed component is highest.

In step S712, after the above-described video analysis is completed, it is determined whether the reference video acting as an analysis reference of the input video exists or not. In steps S713 and S714, when the reference video exists, the texture attributes (i.e., the texture, reflection and edge attributes) are determined as the main component analysis factors, and the color attributes (i.e., lightness, chroma and contrast attributes) are determined as the minor component analysis factors. In steps S715 and S716, when the reference video does not exist, the color attributes (i.e., lightness, chroma and contrast attributes) are determined as the main component analysis factors, and the texture attributes (i.e., the texture, reflection and edge attributes) are determined as the minor component analysis factors. In step S717, after the main and minor component analysis factors of the input video are all determined, the analysis results of the final video quality are calculated by applying Eq. 3 to the k factor in order to express the final video quality analysis results. In step S718, the input video is displayed at the left portion of the window so as to notify the analysis results. In step S719, the main component analysis result, the minor component analysis result, and the automatic final video quality analysis result are displayed from the upper right portion of the window in a form of numerical values and graphs. Through the above-described procedures, the method for automatically analyzing the digital video quality according to the present invention is ended.

The above-described method according to the present invention can be embodied as a program and stored on a computer-readable recording medium. Examples of the computer-readable recording medium may include a read-only memory (ROM), a random-access memory (RAM), a CD-ROM, a floppy disk, a hard disk, and an optical magnetic disk.

In the apparatus and method for automatically analyzing the digital video according to the present invention, the video quality factors are classified into texture attributes and color attributes. Three analysis factors are previously determined through the simulation according to the quality analysis factors. Using the determined quality analysis factors, the characteristics of the input video contents are automatically analyzed and the numerical results are provided. Therefore, unlike the prior art, the numerical data for the video quality can be provided. Also, the video producers can predict in advance the viewer's quality assessment of their video contents.

In addition, the data of the analysis results can be provided as the normalized numerical values ranging from 0 to 100 for each quality factor. Assuming that the numerical value of "50" is defined as the general quality, the attribute values corresponding to the quality factors having lower values than the reference value can be modified based on the video quality analysis factors used as the reference values. In this manner, the quality of the final video contents can be improved. Since the final video quality analysis results are calculated by reflecting the video quality analysis factors and the quality recognition tendency previously obtained from a plurality of observers through the simulation, the above analysis results have the objective validity.

Further, if the producers of digital video contents (e.g., digital movie, animation, broadcasting, and advertisement) standardize the apparatus of the present invention as the industry standard, they can minimize the failure to their video contents produced according to their subjective propensities, that is, which are produced while not sufficiently considering the viewers' recognition of the video quality. Moreover, when the video contents produced according to the present invention are provided as the final result to the general persons, the generally allowable quality can be secured. Consequently, the video quality can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for automatically analyzing digital video quality, comprising:
    a video analyzing unit configured to analyze a texture attribute of an input video and to analyze a color attribute of the input video to obtain a texture attribute analysis result and a color attribute analysis result, respectively, and assign the texture attribute analysis result and the color attribute analysis result to a main component analysis result and a minor analysis result based, upon the existence of a reference video, the textural attribute analysis result and the color attribute analysis result ranging from about zero, the lowest quality, to about 100, the highest quality; and
    a result displaying unit configured to determine the existence of the reference video;
    wherein when the reference video exists, the result displaying unit is configured:
        to determine the texture attribute analysis result as a main component analysis result and the color attribute analysis result as a minor component analysis result, and
        to display the determined analysis results on a screen in a form of numerical values and graphs together with the input video;
    wherein, when the reference video does not exist, the results displaying unit is configured to determine the texture attribute analysis result as the minor component analysis result and the color attribute analysis result as the main component analysis result, respectively, and to display the determined analysis results on the screen in a form of numerical values and graphs together with the input video; and
    wherein a final video quality is determined based upon the following equation:

Final Video Quality ={k$\Sigma$(main component analysis result)+(1−k)$\Sigma$(minor component analysis result) }/3; where k is a predetermined importance factor.

2. The apparatus of claim 1, wherein the texture attribute includes a surface reflection attribute, a surface texture attribute, and an edge attribute, and the color attribute includes lightness, chroma, and contrast.

3. The apparatus of the claim 1, wherein the video analyzing unit includes:
    a texture analyzing unit for analyzing the texture attribute of objects existing in the input video by using a previously stored database and a frequency domain analysis; and
    a color analyzing unit for analyzing the color attribute of R, G and B values for each pixel of the input video.

4. The apparatus of claim 3, wherein the texture analyzing unit includes:
    a preprocessing unit configured to perform a basic analysis on the texture attribute of the input video by using the previously stored database and a video processing in the frequency domain;
    a reflection analyzing unit configured to receive the basic analysis result from the preprocessing unit, analyze a surface reflection attribute of the objects existing in the input video, and output the analysis result in a form of normalized numerical values;
    a surface texture analyzing unit configured to analyze the surface texture of the objects existing in the input video, and output the analysis result in a form of normalized numerical values; and
    an edge analyzing unit configured to analyze the edge attribute of the objects existing in the input video, and output the analysis result in a form of normalized numerical values.

5. The apparatus of claim 3, wherein the color analyzing unit includes:
    a preprocessing unit configured to convert the color values of the inputted signal into device-independent XYZ color space, and converting the color values of the XYZ color space into color values of standard color space;
    a lightness analyzing unit configured to analyze lightness of the input video by using lightness values converted by the preprocessing unit;
    a chroma analyzing unit configured to analyze chroma of the input video by using chroma values converted by the preprocessing unit; and
    a contrast analyzing unit configured to analyze contrast of the input video by using the converted lightness values and the R, G and B color values of the input video.

6. The apparatus of claim 1, wherein the result displaying unit includes:
    a video displaying unit configured to display the input video on a video quality analysis display screen; and
    an analysis result displaying unit configured to display the main component analysis result, the minor component analysis result, and the final quality analysis result in a form of numerical values and graphs.

7. A method for automatically analyzing and displaying digital video quality, comprising the steps of:
    (a) receiving a target video to be analyzed, and determining an importance factor k for determining weights of main and minor components to determine a final video quality;
    (b) performing a preprocessing of a texture analysis, the preprocessing operation including calculating histogram, noise and reflection attribute of an input video and sequentially analyzing a texture attribute, a reflection attribute, and an edge attribute of the input video;
    (c) converting R, G and B color values of the input video into device-independent XYZ color space in combination with the operation (b), converting the XYZ color space into color values of standard color domain, and sequentially analyzing a lightness attribute, a chroma attribute, and a contrast attribute of the input video;

(d) determining, based upon a textual attribute, a color attribute, and whether a reference video exists, a main component analysis result and a minor component analysis result, and calculating a final video quality analysis result by using the determined main and minor component analysis results and the importance factor k based upon the following equation:

Final Video Quality Analysis Result ={kΣ(main component analysis result)+(1−k)Σ(minor component analysis result)}/3 wherein when the reference video exists, the main component analysis result and the minor component analysis result are based on the textual attribute and color attribute, respectively, and when the reference video does not exist, the main component analysis result and the minor component analysis result are based on the color attribute and textual attribute, respectively; and (e) displaying the input video and the final video quality analysis result of the operation (d) in a form of numerical values and graphs.

* * * * *